United States Patent
Rasmussen et al.

(10) Patent No.: US 8,016,977 B2
(45) Date of Patent: Sep. 13, 2011

(54) DRY POND WATER EVAPORATION SYSTEM AND METHOD OF EVAPORATING WATER

(75) Inventors: Rodney Rasmussen, Salt Lake City, UT (US); Paul C. Cox, Salt Lake City, UT (US)

(73) Assignee: Reform Water, LLC, Salt Lake City, UT (US)

( * ) Notice: Subject to any disclaimer, the term of this patent is extended or adjusted under 35 U.S.C. 154(b) by 45 days.

(21) Appl. No.: 12/404,139

(22) Filed: Mar. 13, 2009

(65) Prior Publication Data

US 2010/0139871 A1 Jun. 10, 2010

(51) Int. Cl.
- *B01D 1/16* (2006.01)
- *B01D 1/20* (2006.01)
- *B01D 3/04* (2006.01)
- *C02F 1/12* (2006.01)

(52) U.S. Cl. ....... 159/4.01; 159/44; 159/47.3; 159/48.1; 159/901; 159/DIG. 28; 159/DIG. 40; 202/202; 202/236; 203/1; 203/2; 203/90; 210/150; 210/513; 261/36.1; 261/115

(58) Field of Classification Search .......... 159/4.01, 159/16.1, 43.1, 44, 47.3, 48.1, 901, DIG. 28, 159/DIG. 40; 202/202, 236; 203/1, 2, 10, 203/90, 94, 98; 210/143, 150, 513; 261/36.1, 261/115; 239/270

See application file for complete search history.

(56) References Cited

U.S. PATENT DOCUMENTS

| | | | |
|---|---|---|---|
| 4,363,703 A * | 12/1982 | ElDifrawi et al. | 203/10 |
| 4,405,264 A * | 9/1983 | Brady et al. | 405/270 |
| 4,479,486 A * | 10/1984 | Manning et al. | 126/567 |
| 4,966,655 A * | 10/1990 | Wilkerson, Jr. | 202/234 |
| 5,082,525 A | 1/1992 | Travis | |
| 5,240,560 A | 8/1993 | Gregory | |
| 5,335,728 A | 8/1994 | Strahan | |
| 5,381,742 A | 1/1995 | Linton et al. | |
| 5,509,996 A * | 4/1996 | Assaf | 159/48.2 |
| 5,527,494 A * | 6/1996 | Weinberg et al. | 261/36.1 |
| 5,532,281 A * | 7/1996 | Vass | 521/76 |

(Continued)

FOREIGN PATENT DOCUMENTS

JP 6218357 8/1994

(Continued)

OTHER PUBLICATIONS

Declaration of J. Keith Reidhead and Tyson P. Cox; May 13, 2009.

*Primary Examiner* — Virginia Manoharan
(74) *Attorney, Agent, or Firm* — Workman Nydegger

(57) ABSTRACT

Dry pond water evaporation systems and methods are used to evaporate large quantities of water from industrial waste water sources, such as water produced by oil and gas wells. Dry pond systems include a water evaporation system that emits waste water into the air as a fine spray or mist to promote evaporation. Water that falls to the ground and any initially dissolved solids are captured in a water capture depression. Water and solids are transferred from the water capture depression to a water collection pool. Water from the water collection pool is recirculated through the water evaporation system to further concentrate the total dissolved solids (TDS). When the TDS are sufficiently concentrated, they may be harvested, such as by evaporating off the water and recovering salts or minerals as a solid.

20 Claims, 12 Drawing Sheets

U.S. PATENT DOCUMENTS

| | | |
|---|---|---|
| 5,582,680 A | 12/1996 | Vankouwenberg et al. |
| 6,190,498 B1 | 2/2001 | Blagborne |
| 6,200,428 B1 | 3/2001 | VanKouwenberg |
| 6,637,379 B2 | 10/2003 | Hays et al. |
| 6,749,374 B1 * | 6/2004 | Lane et al. ............ 406/92 |
| 7,005,064 B2 * | 2/2006 | Keller et al. ............ 210/170.04 |
| 7,066,207 B2 * | 6/2006 | Lane et al. ............ 137/810 |
| 7,166,188 B2 * | 1/2007 | Kedem et al. ............ 159/48.2 |
| 7,251,939 B2 | 8/2007 | Walker |
| 2007/0227674 A1 | 10/2007 | Haslem et al. |
| 2007/0235146 A1 | 10/2007 | Haslem et al. |
| 2007/0246414 A1 | 10/2007 | Page et al. |

FOREIGN PATENT DOCUMENTS

| | | |
|---|---|---|
| JP | 7088469 | 4/1995 |
| JP | 2006007097 | 1/2006 |

* cited by examiner

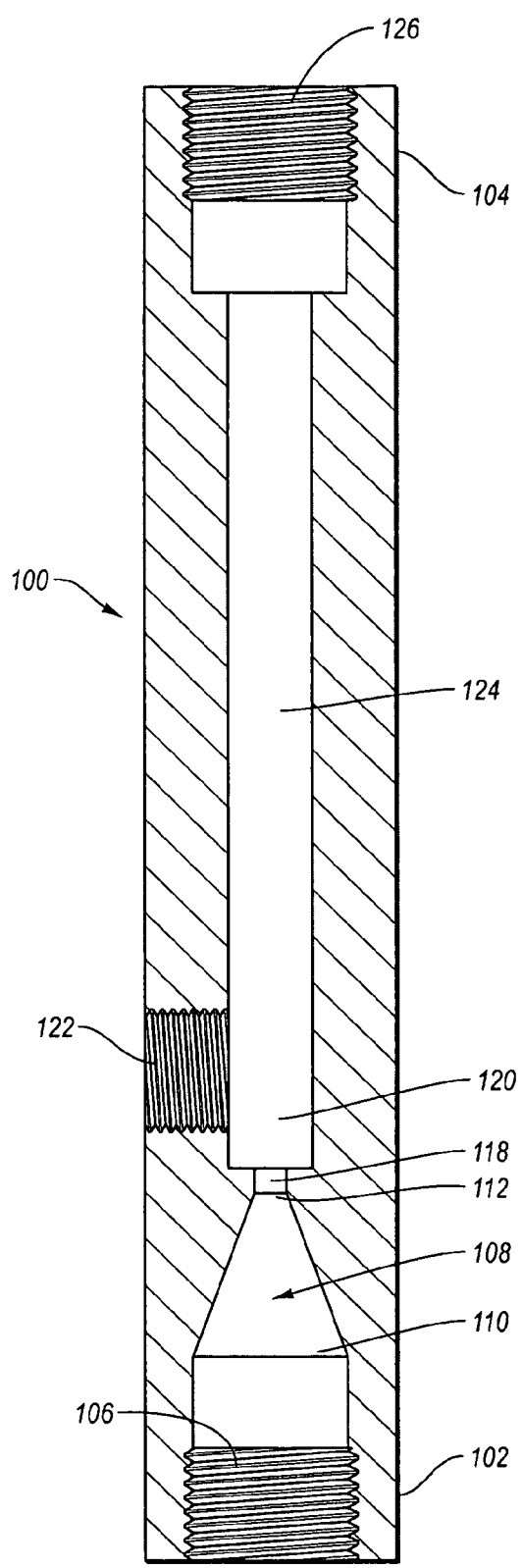
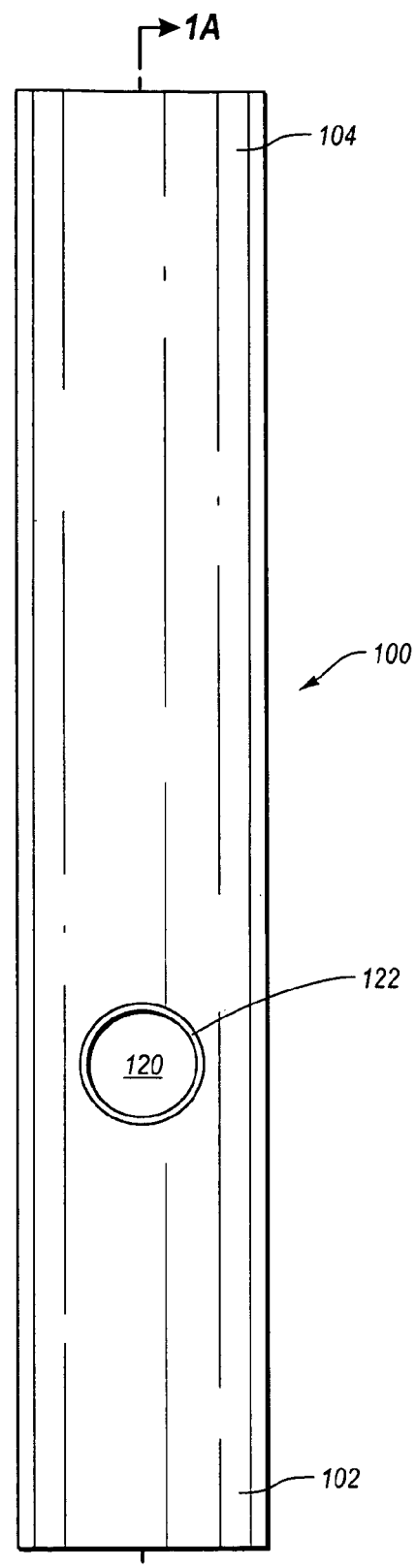
*Fig. 1A*
*Fig. 1B*

DRY POND WATER EVAPORATION SYSTEM AND METHOD OF EVAPORATING WATER

BACKGROUND OF THE INVENTION

1. The Field of the Invention

The present invention relates to water evaporation systems, more particularly to pond-type water evaporation systems for large-scale evaporation of waste water from industrial sources.

2. The Relevant Technology

There are many industrial processes which produce large quantities of water that cannot be legally discharged into rivers, other bodies of water, or onto the ground but must be impounded in evaporation ponds. Examples include waste water produced during the drilling of oil and gas wells, as a byproduct of extracting oil and gas (e.g., natural subsurface water or injected water), farm runoff (e.g., crop irrigation runoff, such as in the Imperial Valley in California, hog farm runoff, cattle farm runoff, and winery waste water), mine tailings wash runoff, mine process waste water (e.g., from gold mining, which water includes cyanide salts and acids), food processing waste water, sewage water, mineral reclamation evaporation ponds (e.g., to recover potash, soda ash, gypsum, magnesium and salt), and waste water discharged from mineral reclamation (e.g., alkaline water in trona ponds resulting from mining soda ash).

Waste water is produced in large quantities during drilling and extraction of natural gas and petroleum. Water is often used during well drilling, which produces contaminated waste water that must be impounded. Petroleum and gas reservoirs often contain edge water, which is natural subterranean water located near the hydrocarbon being extracted. In addition, many producers inject water into the ground (e.g., as a peripheral water drive) in order to drive the oil or gas toward producing wells within the periphery of water injectors. The amount of water extracted as a byproduct of gas or oil production is a fraction of the water cut. The water cut produced from oil and gas wells is typically separated from the oil or gas near the well head and stored in a holding tank. Because the water contains contaminants, it is typically hauled to a licensed impoundment facility for disposal in a lined evaporation pond.

Because evaporation of pond water is generally passive, impoundment ponds are typically very large, sometimes covering up to 50 acres or more to increase the rate of evaporation. The waste water contained in such ponds is often toxic. For these and other reasons, waste water evaporation ponds must generally be placed at remote locations, away from cities, roads, parks and other places where people are likely to congregate. Moreover, industrial waste water impoundments can attract and kill migratory birds and other wildlife. As a result, many locales ban the construction of large water impoundment ponds for environmental and/or safety reasons. For example, water produced at oil and gas wells in Colorado is often shipped to other locations for disposal, such as Utah, at a cost of about $10 to $12 for each barrel of water. About 100,000 barrels of waste water are currently shipped daily from Colorado to Utah, at a total cost of $1,000,000 or more per day.

BRIEF SUMMARY OF THE INVENTION

The present invention relates to dry pond water evaporation systems and methods for evaporating large quantities of waste water and optionally recovering salts or other dissolved solids in the waste water. Examples of waste water sources include sources discussed above including, but not limited to, water produced during the drilling and extraction of oil and gas, farm runoff, mine tailings runoff, mine process water, food processing water, sewage, and water from mineral reclamation. The inventive dry pond water evaporation systems and methods are able to process waste water and convert it into fine water droplets, which are emitted into the air to promote evaporation. Water that is not evaporated and any non-volatile solids initially contained in the waste water fall to the earth and are collected within a dry pond. Dissolved solids contained in the waste water can be recovered.

According to a first aspect of the invention, a dry pond water evaporation system is provided that includes a water evaporation system composed of one or more water evaporation nozzles configured to emit a spray or mist of fine water droplets into the air to promote evaporation; a water capture depression, located on, below, or above the ground, occupying an area at least partially bounded by a raised outer perimeter, and having a water-resistant surface for capturing water and any initially dissolved solids emitted into the air by the water evaporation system that fall down out of the air; and a water collection pool in fluid communication with the water capturing depression and configured to collect water and dissolved solids from the water capture depression.

The water evaporation system can include any water evaporation nozzle known in the art for use in emitting a spray or mist of fine water droplets into the air. According to one embodiment, the water evaporation nozzle can include a barrel having a hollow interior extending between a proximal receiving end and a distal discharge end; an air input orifice at the proximal receiving end of the barrel for receiving pressurized air; an air acceleration chamber within the hollow interior of the barrel and in fluid communication with the air input orifice, the air acceleration chamber having an input end proximal to the air input orifice and having a diameter and an exit end distal to the air input orifice and having a diameter that is less than the diameter of the input end; a water input orifice in fluid communication with the hollow interior of the barrel for receiving pressurized water; a water atomization chamber within the hollow interior of the barrel in fluid communication with the air acceleration chamber and the water input orifice; and a discharge orifice at the distal discharge end of the barrel through which air and water are discharged. A spiral cone emitter nozzle can be attached at the discharge orifice of the barrel. Any number of water evaporation nozzles can be included as desired (e.g., at least about 50) based on the amount of water being evaporated and/or the area of the water capture depression.

According to one embodiment, the water evaporation system furthers includes an air compressor and water pump in fluid communication with the water evaporation nozzles. The water pump may also be in fluid communication with and receive waste water from at least one of a water tank (e.g., that receives water hauled by truck), waste water impoundment pond, or source of industrial waste water production (e.g., a trunk line from an oil or gas well head). The water pump may be in fluid communication with and receive water from the water collection pool in order to recirculate water from the water collection pool through the water evaporation system. This helps keep the water collection pool from overflowing or otherwise exceeding its holding capacity. It also increases the total dissolved solids in the water, facilitating harvesting and recovery of salts or minerals therefrom. To that end, the system may further include at least one dissolved solids recovery pond or vessel for receiving water having a high concentration of total dissolved solids from the water collection pool and evaporating water therefrom, facilitating recovery of the salts or minerals. Alternatively, the concentrated brine water can be sold.

The water evaporation system may be equipped with automatic sensor and adjustment controls, which can identify and dynamically adjust for changes in one or more variables such as wind velocity, wind direction, relative humidity, temperature, barometric pressure and rain. The air pressure and/or water pressure delivered to the water evaporation nozzles can be increased or decreased as necessary (e.g., by switches and valves) to control the size and quantity of the water droplets emitted into the air. The effects of higher winds, lower humidity, lower temperature and lower barometric pressure may be offset by lower air pressure and/or higher water pressure. The effects of lower winds, higher humidity, higher temperature, higher barometric pressure, or rain may be offset by higher air pressure and/or lower water pressure. In addition, a mobile water evaporation unit might be positionable so as to maximize the down-wind water capture area and ensure most or all of the water mist and initially dissolved solids are captured. In addition, the angle of the spray nozzles may be controlled to alter the direction of the spray.

The raised outer perimeter of the water capture depression may include an earthen berm, and the water-resistant surface of the water capture depression may include a water-proof liner. The water-proof liner can have a color (e.g., black or other dark color) that absorbs heat energy from sunlight and promotes evaporation of water captured in the water capture depression. The water-proof liner may be a polymer membrane, such as a 40-60 mil thick high density polyethylene (HDPE). The water capture depression may include compacted clay underlying the water-proof liner. The water capture depression may advantageously slope toward the water collection pool in order for excess water captured in the water capture depression to drain toward the water collection pool.

The water collection pool can have a water-proof liner, such as a double layered polymer membrane, such as two layers of a 40-60 mil thick high density polyethylene (HDPE). The water collection pool can be open to the air to promote further evaporation or it may be covered. The term "water collection pool" shall broadly encompass any pool, vessel or tank that can receive and hold therein water and dissolved solids from the water capture depression.

According to one embodiment, the air compressor and water pump of the water evaporation system may be positioned outside of the area defining the water capture depression in order to prevent buildup of salts or minerals that may fall back to the ground during evaporation of the waste water. For greater safety and cleanliness, a security fence may be placed around the water capture depression and water collection pool.

According to a second aspect of the invention, a method of evaporating water from a source of waste water is provided, which comprises: emitting a fine spray or mist of waste water into the air above a water capture depression located on, below or above the ground so as to promote evaporation of a first portion of the water, a second portion of the water falling out of the air toward the water capture depression; capturing the second portion of the water falling out of the air in the water capture depression; transferring at least a portion of the water captured in the water capture depression to a water collection pool; and emitting a recirculated water stream from the water collection pool as part of the fine spray or mist of waste water.

According to one embodiment, the waste water may contain initially dissolved solids. In that case, the water capture depression captures the initially dissolved solids, either in the form of concentrated water droplet or dry solid particulates. Thereafter, the dissolved or undissolved solids are transferred to the water collection pool, such as by concentrated water flowing from the water capture depression to the water collection pool or sweeping or washing the dissolved or undissolved solids using a mechanical or water sweep. If desired, water from the water collection pool can be recirculated back through the water evaporation system in order to further concentrate the total dissolved solids within the water collection pool over time.

The method may further include harvesting salts or minerals from water contained in the water collection pool. The salts or minerals can be harvested by removing a water stream from the water collection pool containing dissolved solids and evaporating water from the water stream to concentrate or isolate the salts or minerals.

These and other advantages and features of the present invention will become more filly apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 1A is a cross-sectional view of an exemplary water evaporation nozzle for use with the dry pond water evaporation systems according to the invention;

FIG. 1B is a side perspective view of the exemplary water evaporation nozzle of FIG. 1A;

DETAILED DESCRIPTION OF THE PREFERRED EMBODIMENTS

The present invention relates to dry pond water evaporation systems and methods for evaporating water from a waste water source. Although the water evaporation, systems and methods can be employed in a variety of different situations where it is desirable to evaporate a large quantity of water into the atmosphere, such as water from most any impoundment pond, the present invention is especially well suited for disposing of waste water generated by the oil and gas industry. The inventive dry pond water evaporation systems and methods including emitting a spray or mist of fine water droplets and any initially dissolved solids into the air to promote evaporation, capturing a portion of the water and the initially dissolved solids in a water capture depression, and transferring at least a portion of the captured water and initially dissolved solids to a water collection pool.

According to one embodiment, water from the water collection pool can be mixed into the spray or mist of fine water droplets to further concentrate total dissolved solids in the water collection pool. Salts or minerals can be harvested or collected from concentrated water removed from the water collection pool, such as by evaporating the remaining water using an evaporation pond or platform and recovering the dried material.

I. Exemplary Water Evaporation Nozzles and Systems

The dry pond water evaporation systems and methods according to the invention can be used with any known water evaporation systems designed to emit a spray or mist of fine water droplets into the air to promote evaporation. By way of example, several water evaporation nozzles and water evaporation system are illustrated in FIGS. 1-7 and described herein. It will be appreciated that the following descriptions are merely illustrations of exemplary water evaporation nozzles and systems that can be used with the inventive dry pond water evaporation systems of the invention.

A first example of a water evaporation nozzle for use in the inventive dry pond water evaporation systems is illustrated in FIGS. 1A and 1B. The water evaporation nozzle in this example includes a barrel 100 having a proximal receiving end 102, a distal discharge end 104, and a hollow interior extending between the proximal receiving end 102 and distal discharge end 104. The barrel 100 can have any desired outer diameter depending on the desired size of the water evaporation nozzle. According to one embodiment, the barrel 100 can have a diameter in a range of about 1-3 inches, e.g., about 1½ inch. As will be discussed below, by passing pressurized air through the hollow interior of the barrel 100, water is atomized within barrel 100 to form fine water droplets and then discharged out the distal discharge end as a fine mist or spray.

Figure 1C:
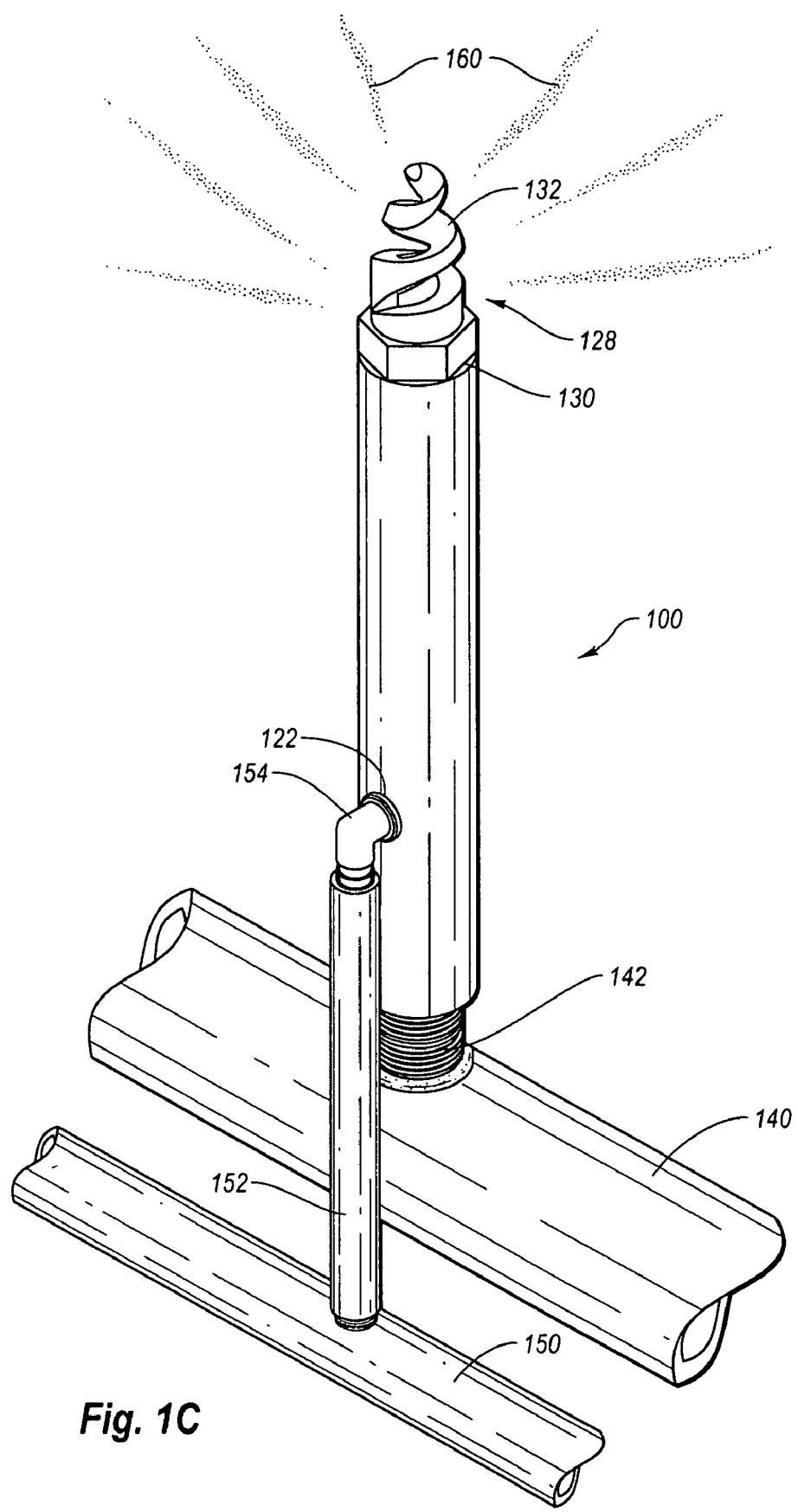
FIG. 1C is a perspective view of an exemplary water evaporation system including pressurizable water and air lines connected to the water evaporation nozzle of FIGS. 1A and 1B and shown emitting a fine spray of water.

Barrel 100 includes an air input orifice 106 at the proximal receiving end 102. The air input orifice can have any desired diameter depending on the size of the water evaporation nozzle. According to one embodiment, the air input orifice can have a diameter of about ½ to 1 inch (e.g., ¾ inch), for example when the barrel 100 has an outer diameter of about 1½ inch. It may be advantageous for the air input orifice 106 to have a diameter corresponding to standard pipe sizes. As illustrated in FIG. 1A, the air input orifice 106 is threaded so as to provide means for coupling the receiving end 102 of the water evaporation barrel 100 to a pressurized air line (see FIG. 1C), such as by means of a threaded nipple attached to the pressurized air line. Such threads are an example of coupling means for attaching the barrel 100 to a pressurized air line, more particularly for attaching the barrel 100 to a nipple attached to the pressurized air line. Other examples of coupling means include quick release couplers known in the art. It will be appreciated that any means known in the art for coupling two pipes or hoses together may be used as the coupling means according to the invention.

In fluid communication with the air input orifice 106 is an air acceleration chamber 108. The air acceleration chamber 108 includes an input end 110 and an exit end 112. The air acceleration chamber 108 is tapered so as to become narrower going from the input end 110 to the exit end 112. This constricts the air flow pathway and causes the pressurized air to accelerate. In this embodiment, the air acceleration chamber 108 is illustrated as being frustoconical, or having a truncated cone-shaped cross section. It will be appreciated, however, that air acceleration chamber 108 can have any design in which the air flow pathway is constricted so to accelerate air moving from the input end 110 toward and through the exit end 112. For example, the air acceleration chamber 108 can alternatively be bell shaped. It may be stepped, such as by tiny concentric circular steps that decrease in diameter moving from the input end 110 to the exit end 112. Any shape that includes a constriction for accelerating air through the hollow interior of the barrel 100 is an example of air acceleration means.

The overall dimensions of the air acceleration chamber 108, including the input end 110 and exit end 122, typically depend on the overall size of the water evaporation nozzle. According to one embodiment, such as when the input orifice 106 has a diameter of about 1 inch, the diameter of the air acceleration chamber 108 at input end 110 may also be about 1 inch, and the diameter of the air acceleration chamber 108 at exit end 112 can be about ¹⁄₁₆ to about ¼ inch, e.g., about ³⁄₃₂ inch. In general, the diameter of the input end 110 is at least about 100% greater than the diameter of the exit end 112, preferably at least about 150% greater, more preferably at least about 200% greater, and most preferably at least about 300% greater.

As illustrated in FIG. 1A, positioned distally just beyond the exit end 112 of air acceleration chamber 108 is an air discharge passageway 118. Air discharge passageway 118 may have the same or similar diameter as exit end 112 of air acceleration chamber 108. The air discharge passageway 118 can be relatively short, such as less than about 75% of the length of the air acceleration chamber 108, preferably less than about 50%.

Air discharge passageway 118 is interposed between and fluidly interconnects air acceleration chamber 108 with initial mixing chamber 120, which has a diameter greater than the exit end 112 of air acceleration chamber 108 and air discharge passageway 118 in order to create a negative pressure within initial mixing chamber 120. In general, the diameter of the mixing chamber 120 will be at least about 100% greater than the diameter of the exit end 112 of the air acceleration chamber 108.

A water input port or orifice 122 is positioned through a sidewall of barrel 100 and is in fluid communication with the initial mixing chamber 120. The water input orifice 122 can be threaded in order to provide coupling means for connecting the water evaporation barrel 100 to a water line such as, for example, a line positioned or submerged beneath the surface of a waste water impoundment pond. The diameter of the water input orifice 122 generally depends on the overall size of the water evaporation nozzle. According to one example, such as when the barrel 100 has an outer diameter of about 1½ inch, the water input orifice 122 can have a diameter of about ¾ inch, preferably about ½ inch.

Negative pressure within the initial mixing chamber 120 produced by fast moving air passing therethrough causes initial mixing between water introduced into the mixing chamber 120 from water input port 122 and pressurized air entering the mixing chamber 120 from air acceleration chamber 108. Initial mixing chamber 120 is therefore an example of mixing means for initially mixing water and air within the hollow interior of barrel 100.

Distal to initial mixing chamber 120, and in fluid communication therewith, is a water atomization chamber 124. The diameter and length of the water atomization chamber are generally dependent on the size of the water evaporation nozzle. According to one embodiment, such as when the barrel 100 has an outer diameter of about 1½ inch, the water atomization chamber 124 can have a diameter of about ½ inch. In general, the diameter of the water atomization chamber 124 will be at least about 100% greater than the diameter of the exit end 112 of the air acceleration chamber 108.

The water atomization chamber 124 typically has a length at least about 20% of the length of the hollow interior of the barrel 100, preferably at least about 30%, and more preferably at least about 50% of the length of the hollow interior of the barrel 100. In the case where water is introduced into the initial mixing chamber 120 under pressure, rather than by suction or negative pressure alone, the length of water atomization chamber 124 is generally longer. In the case where the outer diameter of the barrel 100 is about 1½, the water atomization chamber 124 can have a length of about 3-5 inches, e.g., about 4¼ inches.

Pressurized air and water from the initial mixing chamber 120 enter the water atomization chamber 124 at great speed and turbulence, causing churning and rapid intermixing, thereby forming fine droplets of water. The water atomization chamber 124 is an example of water atomization means for producing small droplets of water within the hollow interior of the barrel 100.

Distal to the water atomization chamber 124 is a discharge orifice 126 at the distal discharge end 104 of the barrel 100. The discharge orifice 126 can be threaded in order to provide coupling means for coupling the distal discharge end 104 of the barrel 100 to a spray nozzle. It will be appreciated that the spray nozzle may comprise any spray nozzle known in the art for emitting a spray or cloud of water into the air. According to one embodiment, such as when the barrel 100 has an outer diameter of about 1½ inch, the discharge orifice 126 can have a diameter of about 1 inch. It may be advantageous for the discharge orifice 126 to have a diameter corresponding to standard spray nozzle sizes.

FIG. 1C is a perspective view of a pressurized water evaporation system comprised of the water evaporation barrel 100 of FIGS. 1A and 1B in combination with a pressurizable air line 140, a pressurizable water line 150, and a spray nozzle comprised of a spiral cone nozzle 128. Spiral cone nozzle 128 includes a threaded coupling end 130 that can be threadably coupled to the threaded discharge orifice 126 and a corkscrew discharge end 132 that emits a spray or a cloud of fine water droplets in a desired pattern above or external to the barrel 100. Spiral cone nozzle 128 is an example of spray means for creating a desired spray pattern of fine water droplets above or external to the barrel 100. It will be appreciated, however, that any sprayer or sprinkler known in the art may comprise the spray means.

Barrel 100 is attached to the pressurizable air line 140 by means of a nipple 142. The nipple 142 includes threads so as to threadably couple with the threaded air input orifice 106 of barrel 100. The nipple 142 can be attached to pressurizable air line 140 using any desired means, such as by welding, threaded engagement, or other attachment means known in the art. In the case where it is welded to pressurizable air line 140, the base of nipple 142 can be welded to the outer surface of air line 140. According to one embodiment, the diameter of the hole through air line 140 can be smaller than the inner diameter of nipple 142, such as less than about 75%, or 50%, or about 25% smaller than the inner diameter of nipple 142. For example, if nipple 142 has an inner diameter of about 1 inch, the hole through the air line 140 can be ¾ inch or smaller, e.g., ½ inch or ¼ inch. A hole can be drilled through the air line 140 where it is desired to attach a barrel, and the nipple 142 is welded into air line 140 so as to encompass the hole.

The pressurizable water line 150 is attached to input part 122 barrel 100 by means of a pipe or tube 152 and a threaded nipple 154. The pipe or tube 152 may be attached to pressurizable water line 150 using any desired means, such as welding, threaded engagement, or other attachment means known in the art. The pipe or tube 152 may be attached to nipple 154 using any appropriate means known in the art, an example of which is a barbed sleeve (not shown) inserted within the pipe or tube 152, as is commonly used when connecting pressurized flexible sprinkler tubing to a nipple or tubing joint.

In use, pressurized air from the pressurizable air line 140 is forced through the hollow interior of water evaporation barrel 100, and pressurized water is introduced from pressurizable water line 150 into initial mixing chamber 120. From there, the pressurized water and air are introduced into the water atomization chamber 124, which causes churning or thorough mixing of the pressurized water and air so as to form fine droplets of water, which are emitted through the discharged nozzle 128 as a fine spray or mist of atomized water 160.

Figure 2:
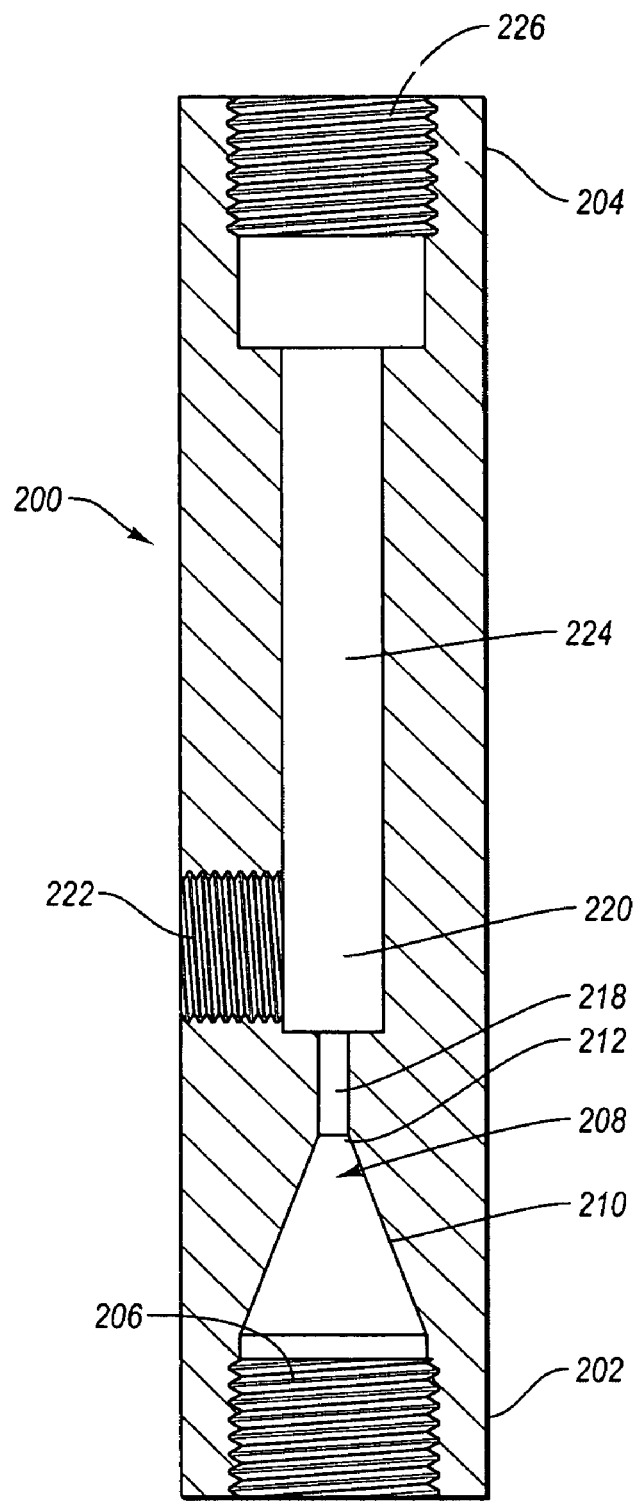
FIG. 2 is a cross-sectional view of another exemplary water evaporation nozzle according to the invention.

An alternative example of a water evaporation nozzle is illustrated in FIG. 2. The water evaporation nozzle in this example is similar to the one illustrated in FIGS. 1A-1C and has been shown to work well in evaporating water from a natural gas well impoundment pond using suction to draw the water into the hollow interior of the nozzle. Nevertheless, it can be adapted to work with pressurized water evaporation systems according to the invention, such as by using as is or elongating the barrel and/or water atomization chamber. The water evaporation nozzle of FIG. 2 includes a barrel 200 having a proximal receiving end 202, a distal discharge end 204, and a hollow interior extending between the proximal receiving end 202 and distal discharge end 204. Barrel 200 further includes an air input orifice 206 at proximal receiving end 202 which is threaded to provide means for coupling the receiving end 202 to a nipple attached to a pressurized air line (see FIG. 1C).

In fluid communication with air input orifice 206 is a tapered air acceleration chamber 208, which includes an input end 210 and an exit end 212. An air discharge passageway 218 is provided, which interconnects exit end 212 with an initial mixing chamber 220. Initial mixing chamber 220 has a diameter greater than exit end 212 and air discharge passageway 218 in order to create a negative pressure within the mixing chamber 120, such as by the venturi effect. A threaded water input orifice 222 is positioned through a sidewall of barrel 200 and is in fluid communication with the mixing chamber 220. Negative pressure within the mixing chamber 220 causes water to be drawn into the mixing chamber 220 through water input port 222 by suction or negative pressure. Alternatively, pressurized water can be introduced into mixing chamber 220 according to the invention.

Distal to the initial mixing chamber 220, and in fluid communication therewith, is a water atomization chamber 224. Pressurized air and water from mixing chamber 220 enter water atomization chamber 224 and form fine droplets of water.

Distal to water atomization chamber 224 is a threaded discharge orifice 226 at the distal discharge end 204 of barrel 200. Threaded discharge orifice 226 provides coupling means for releasably coupling the distal discharge end 204 of barrel 200 to a spray nozzle.

Figure 3A:
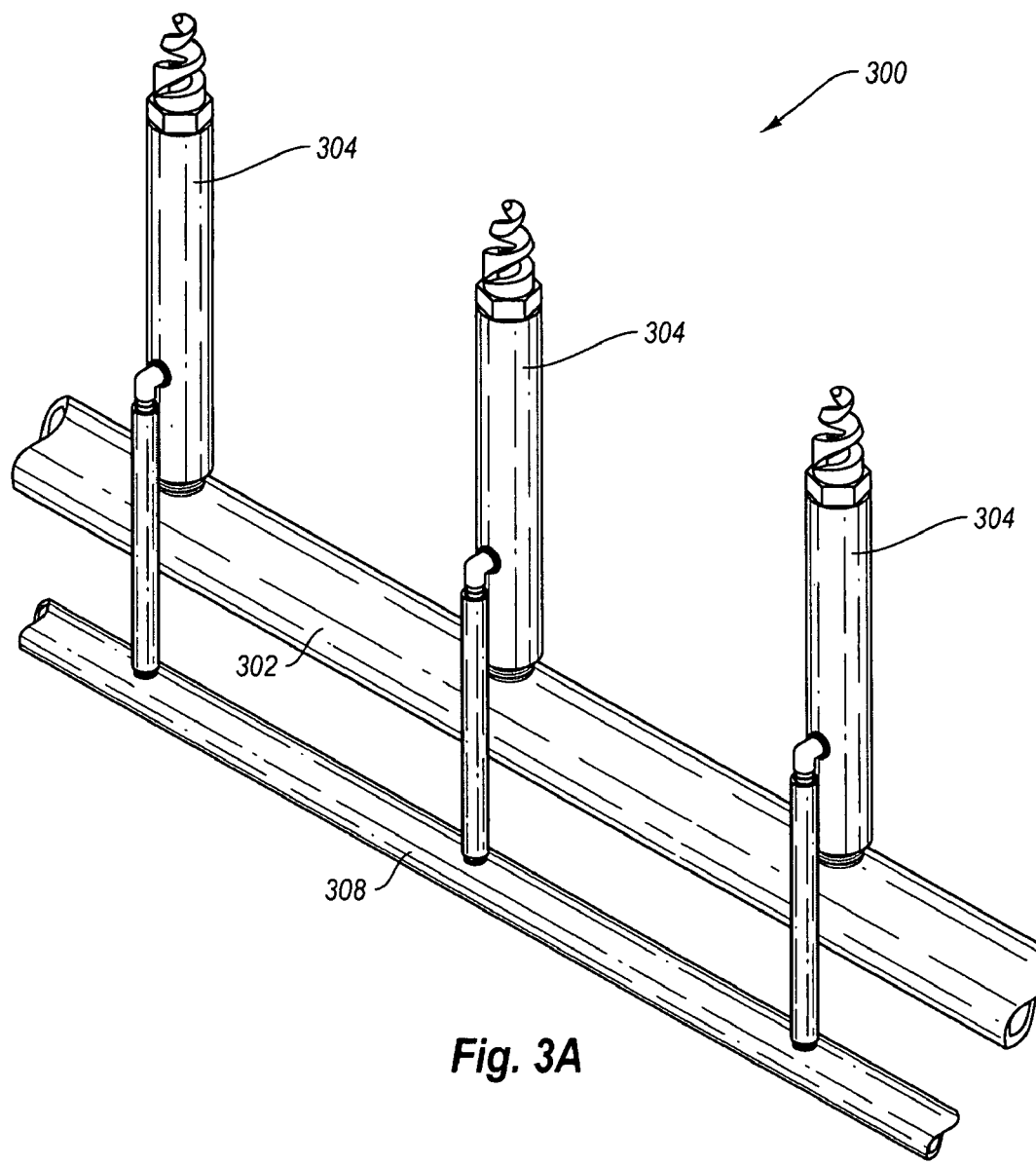
FIG. 3A illustrates an exemplary water evaporation system for use with a dry pond evaporation system including multiple water evaporation nozzles aligned in a single row along pressurizable air and water lines.

A water evaporation system is provided that utilizes one or more water evaporation nozzle or barrels as disclosed herein. As shown in FIG. 3A, an exemplary water evaporation system 300 includes a pressurizable air line 302 and a pressurizable water line 308 coupled to a plurality of water evaporation nozzles 304, such as those illustrated in FIGS. 1A-1C and 2 above. In this embodiment, the water evaporation nozzles 304 are aligned in parallel fashion along the top of pressurizable air line 302 so as to provide a single row of water evaporation nozzles 304.

Figure 3B:
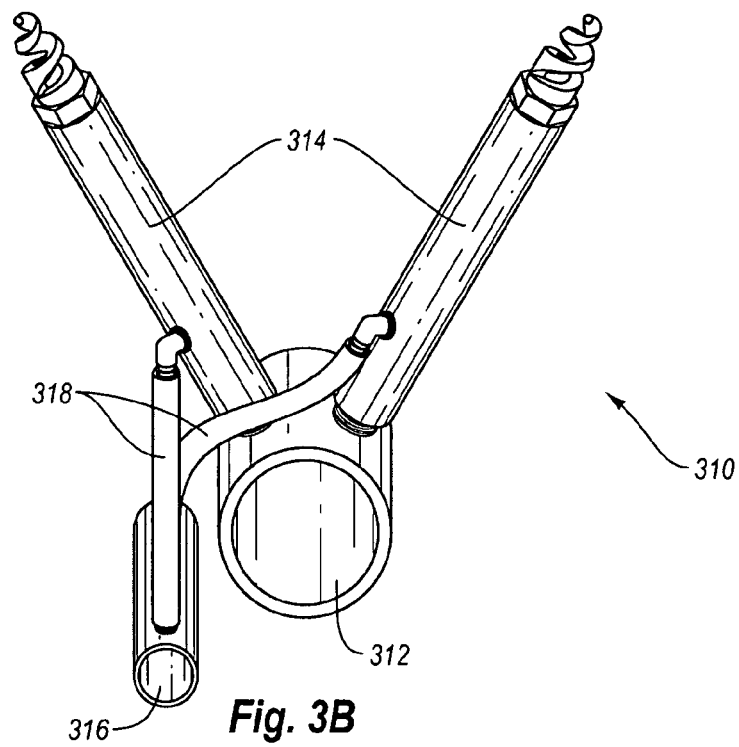
FIG. 3B illustrates an exemplary water evaporation system in which a pair of water evaporation nozzles connected to pressurizable air and water lines are angled relative to each other and disposed on opposite sides of the pressurizable air line.

FIG. 3B illustrates an alternative embodiment of a water evaporation system 310 according to the invention. Water evaporation system 310 includes a pair of water evaporation nozzles 314 connected close together but positioned so as to project outwardly from pressurizable air line 312 at different angles. In this way, the water evaporation nozzles 314 spray water into the air on opposite sides of pressurizable air line 312. Pressurizable water line 316 provides pressurized water to water evaporation nozzles 314 via pipes or tubes 318.

Figure 3C:
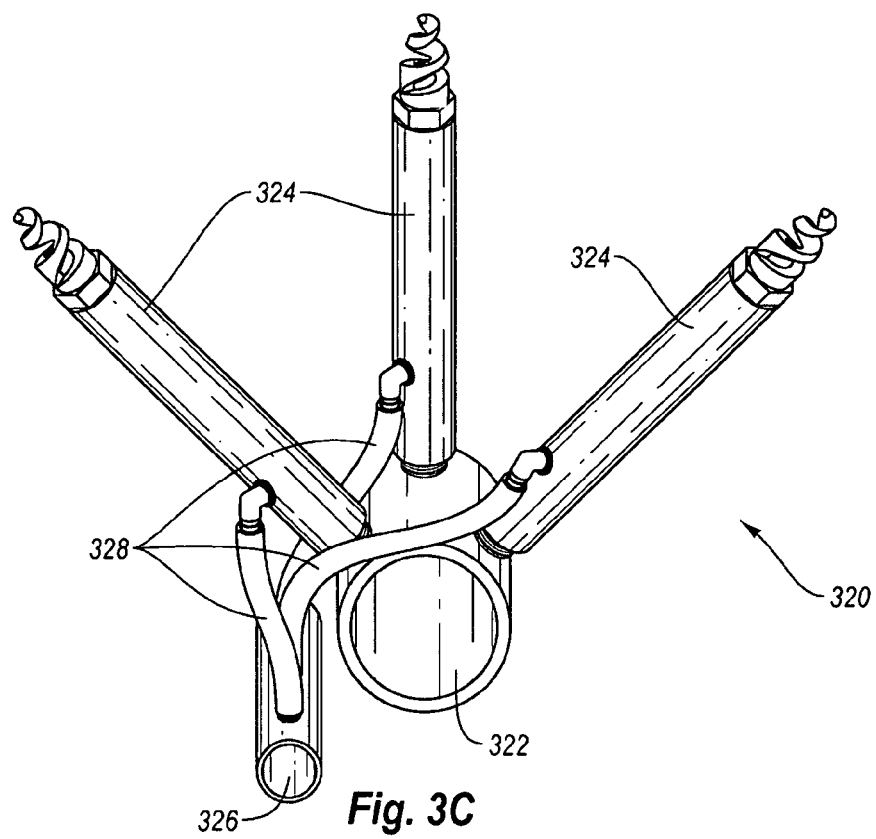
FIG. 3C illustrates an exemplary water evaporation system in which three water evaporation nozzles are connected to a pressurizable air line at different angles.

FIG. 3C shows yet another embodiment of a water evaporation system 320 according to the invention. Water evaporation system 320 includes a pressurizable air line 322 and three water evaporation nozzles 324 positioned close together, one of which extends upward, and two of which are offset at side angles in order to emit water in three different directions relative to pressurized air line 322. Pressurizable water line 326 provides pressurized water to water evaporation nozzles 324 via pipes or tubes 328.

Figure 4:
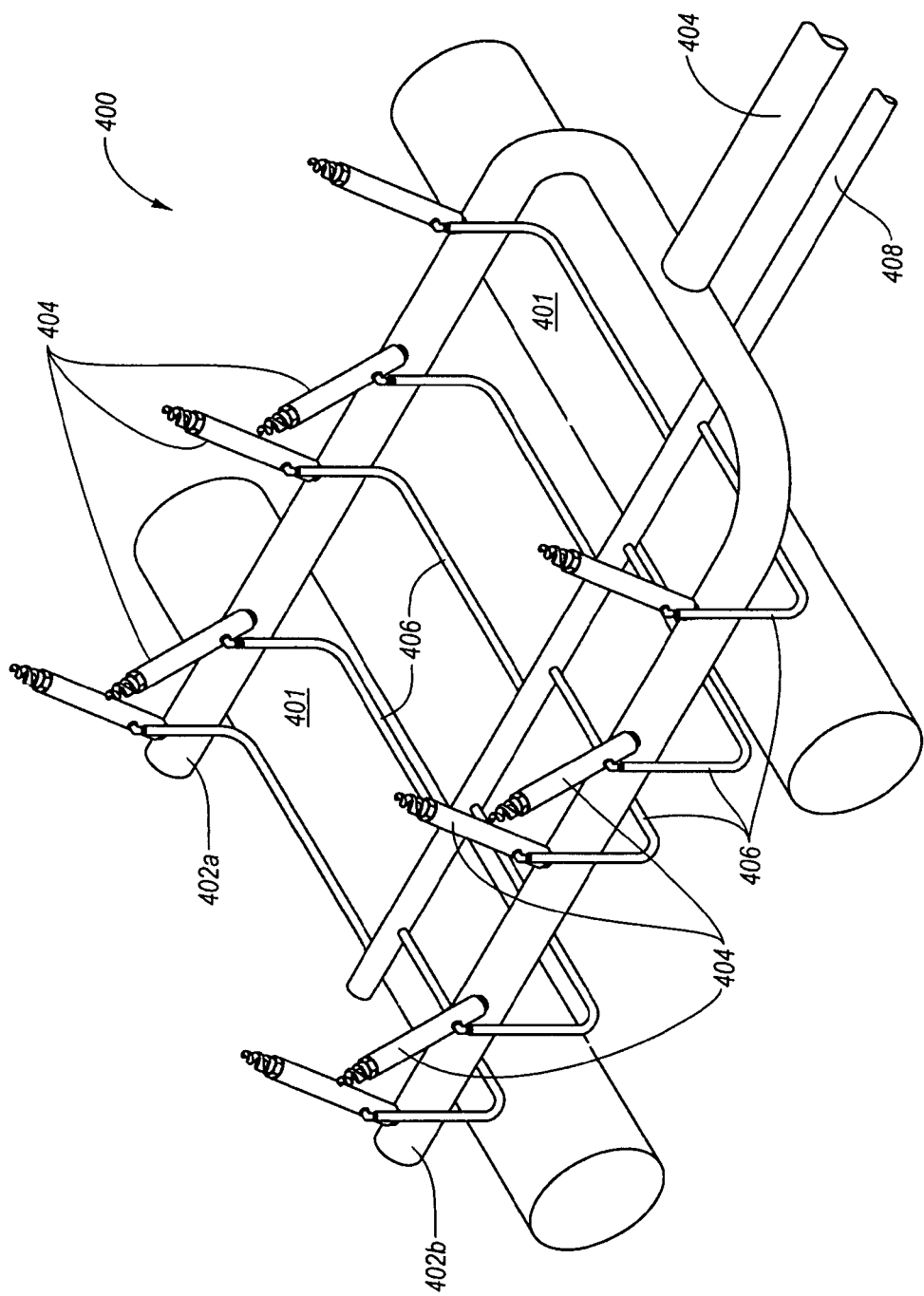
FIG. 4 illustrates an exemplary water evaporation system designed to rest within a water capture depression of a dry pond evaporation system and which includes a pressurizable water line and a branched pressurizable air line with multiple water evaporation nozzles attached in staggered fashion alone each air line branch.

FIG. 4 illustrates a portable water evaporation system 400 that is designed to rest within the area defined by a water capture depression of a dry pond system (not shown). The water evaporation system 400 includes a pair of support legs 401 designed to rest on top of a solid surface and/or float atop a water pond. Attached to support legs 401 is a pressurizable air line 402, which is divided into a first branch 402a and a second branch 402b. Attached to each air line branch 402a, 402b, are a plurality of water evaporation nozzles 404. The water evaporation nozzles each include a water input line 406 coupled to and in fluid communication with a pressurizable water line 408. As shown in FIG. 4, the water evaporation nozzles 404 can be staggered by alternating angles relative to air lines 402a, 402b. This configuration provides greater separation between the individual clouds of fine water droplets in order to maximize evaporation and minimize collision and aggregation of fine water droplets into larger water drops that can fall back to the pond.

Figure 5:
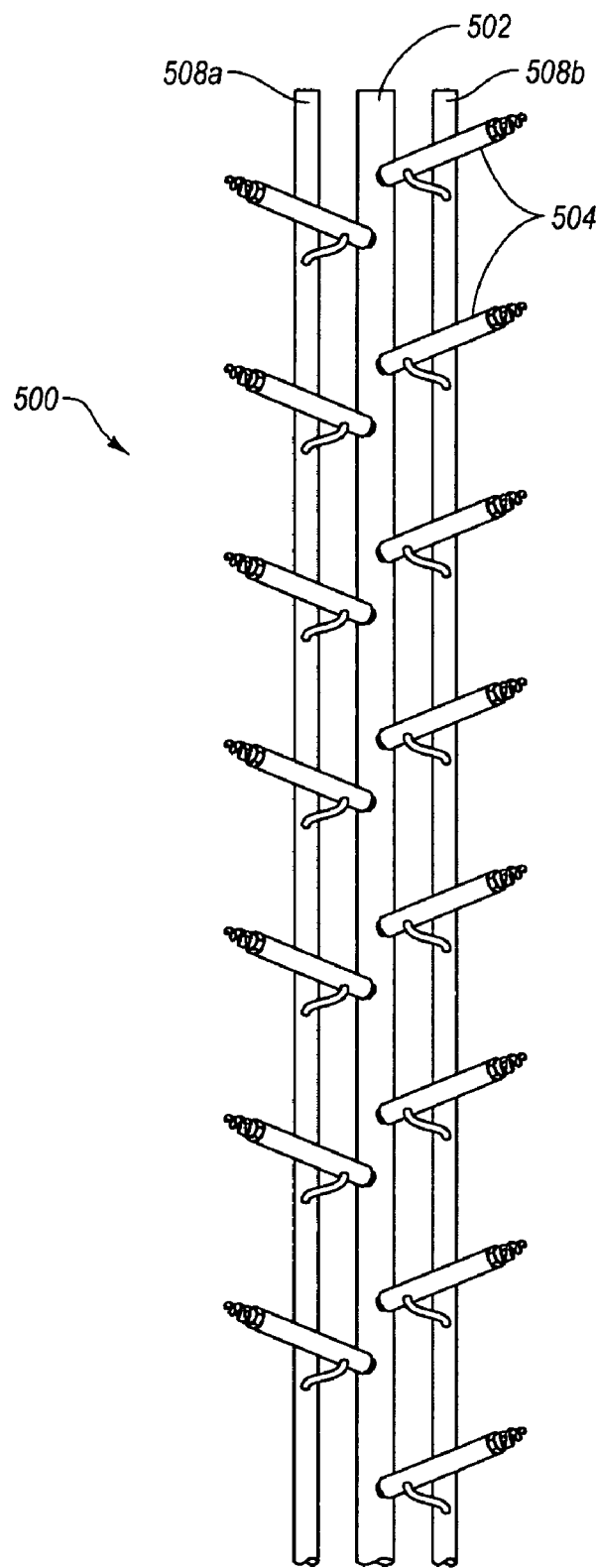
FIG. 5 illustrates another exemplary water evaporation system including a pressurizable air line to which multiple water evaporation nozzles are attached in staggered fashion and a pair of pressurizable water lines positioned so as feed pressurized water to corresponding staggered water evaporation nozzles.

FIG. 5 illustrates another example of a water evaporation system according to the invention. More particularly, water evaporation system 500 is a non-floating fixed or portable system that includes a pressurizable air line 502 to which plurality of water evaporation nozzles 504 are attached in staggered fashion in order to evenly distribute the spray or mist of fine water droplets above pressurizable air line 502. Also included is a pair of pressurizable water lines 508a, 508b, which are positioned relative to the pressurizable air line 502 and evaporation nozzles 504 so as to feed pressurized water to corresponding staggered water evaporation nozzles 504. As will be discussed more fully below, pressurizable air line 502 can receive pressurized air from an air compressor, and pressurizable water lines 508a and 508b can receive pressurized water from a water pump in fluid communication with a source of waste water to be evaporated.

Figure 6:
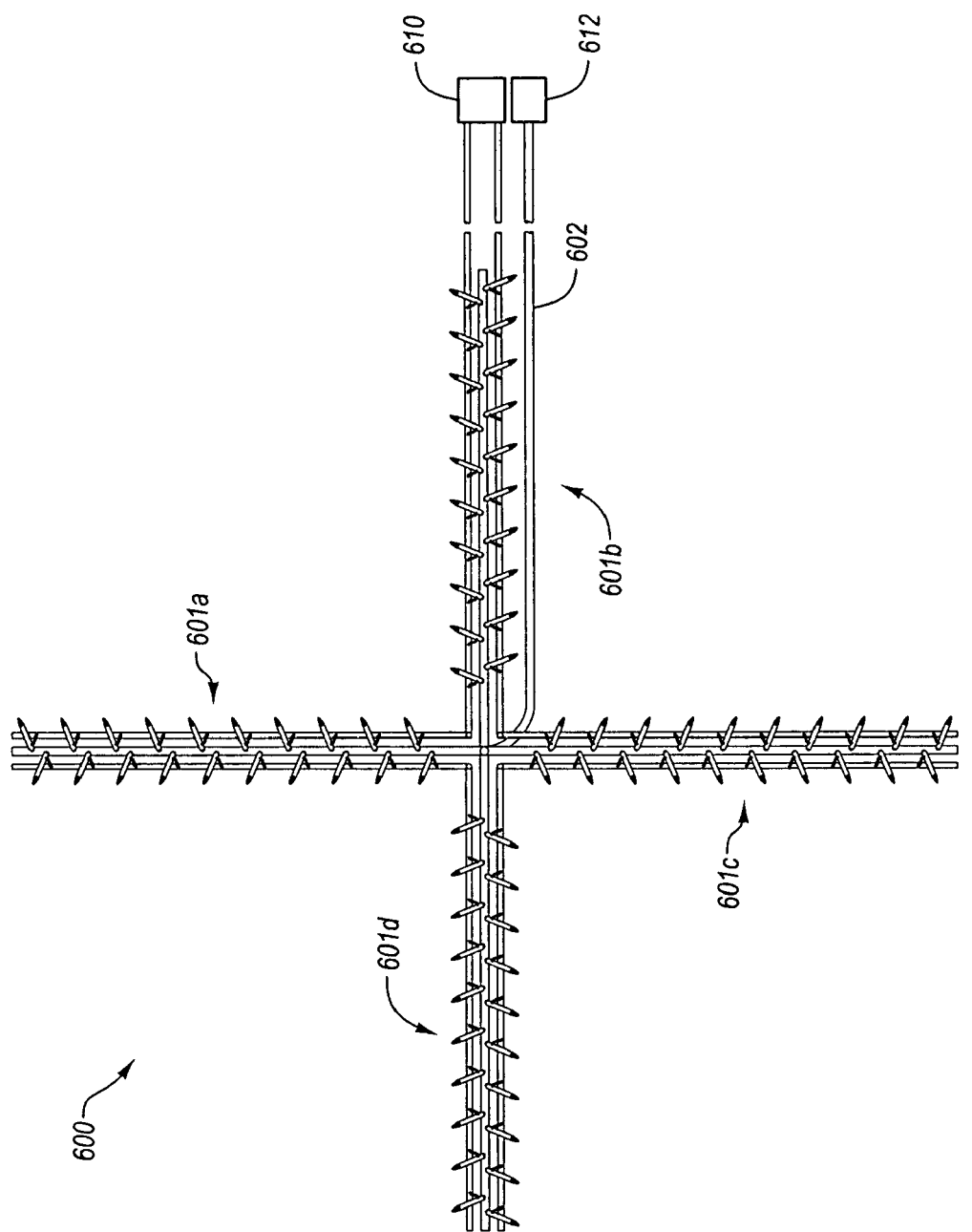
FIG. 6 illustrates an exemplary branched water evaporation system for use in evaporating water over a large area, such as a water capture depression of a dry pond.

FIG. 6 illustrates an exemplary branched water evaporation system 600 for use in evaporating waste water over a large surface area, such as the area defined by a water capture depression of a dry pond system. Water evaporation system 600 includes four branches 601a, 601b, 601c, 601d of pressurized water evaporation systems, such as water evaporation system 500 of FIG. 5, spaced 90° apart in order to distribute fine droplets of water for evaporation in four different quadrants or directions. A pressurizable air line 602 attached to air compressor 612 brings pressurized air to the center of branched evaporation system 600, more particularly to the pressurizable air line branches to which the water evaporation nozzles are fluidly connected. Similarly, pressurized water lines 608a, 608b attached to water pump 610 bring pressurized water to the pressurizable water line branches to which the water evaporation nozzles are fluidly connected. The length of individual branches 601a, 601b, 601c, 601d may be the same, or they may vary depending the desired shape of the spray pattern. For example, if the branched pressurized water evaporation system 600 is used in a square water capture pond or depression, the branches may be of equal length. Alternatively, if the water capture pond or depression is rectangular, two of the branches extending in opposite directions may be longer to provide a more rectangular spray pattern.

Figure 7:
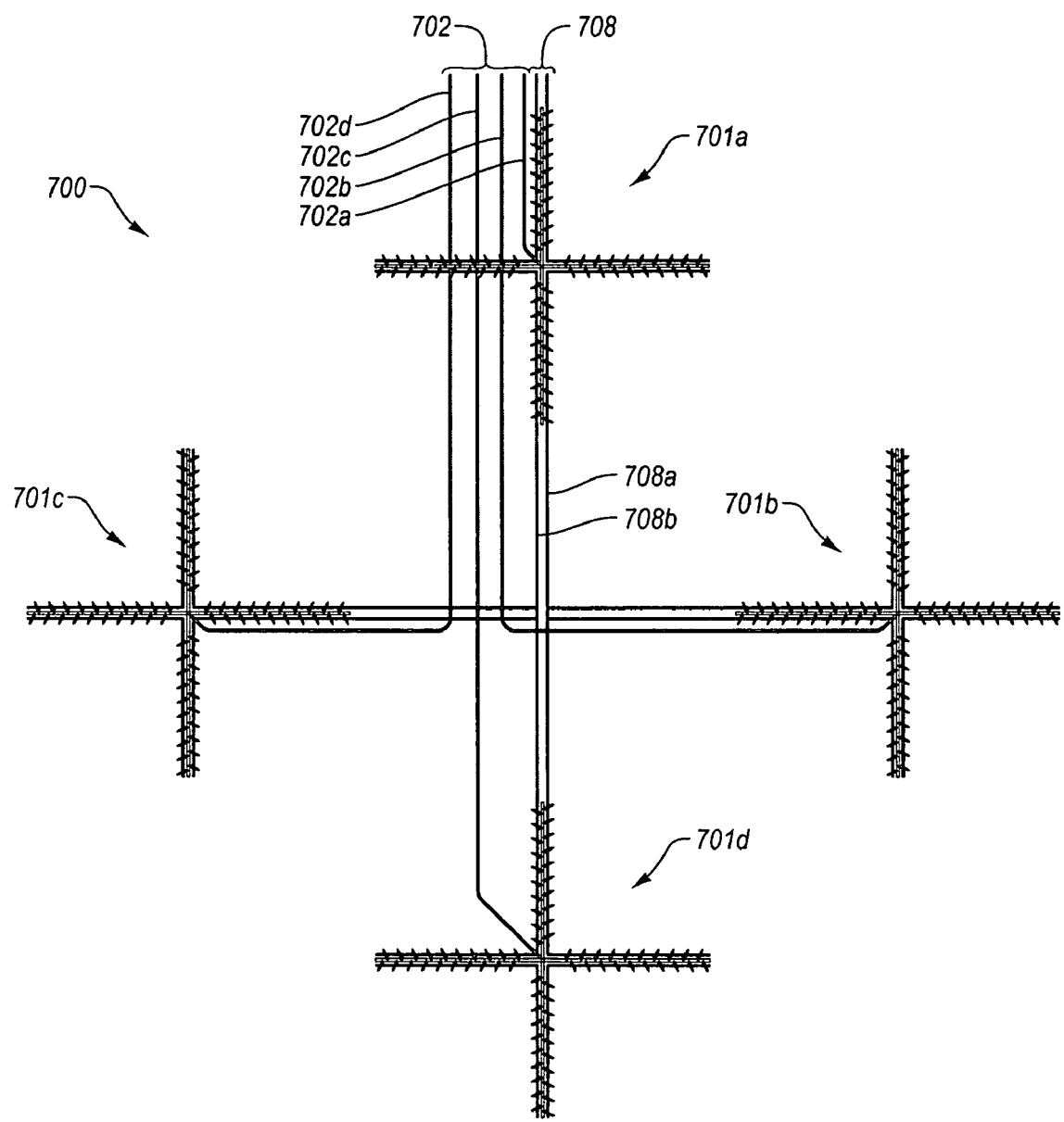
FIG. 7 illustrates a multiply branched pressurized water evaporation system for use in evaporating water over an even larger area, such as a water capture depression of a dry pond.

FIG. 7 illustrates a multiply branched water evaporation system 700 for use in evaporating water over an even larger surface area, such as the area defined by a water capture depression of a dry pond system. Multiply branch system 700 includes branched water evaporation subsections 701a, 701b, 701c, 701d, which may consist of the branched water evaporations system 600 of FIG. 6. A pressurized air line system 702 comprised of four pressurized air line branches 702a, 702b, 702c, 702d bring pressurized air to the pressurizable air lines of each water evaporation subsection 701a, 701b, 701c, 701d. Similarly, pressurized water line system 708 comprised of water line branches 708a, 702b bring pressurized water to the pressurizable water lines of each water evaporation subsection 701a, 701b, 701c, 701d.

The branched water evaporation subsections 701a, 701b, 701c, 701d are shown positioned in four equally spaced apart quadrants in order to equally distribute fine water droplets above each of the quadrants. The water evaporation subsections 701a, 701b, 701c, 701d may alternatively be spaced apart in different configurations depending on the size and/or shape of the desired spray pattern.

II. Exemplary Dry Pond Water Evaporation Systems

Figure 8A:
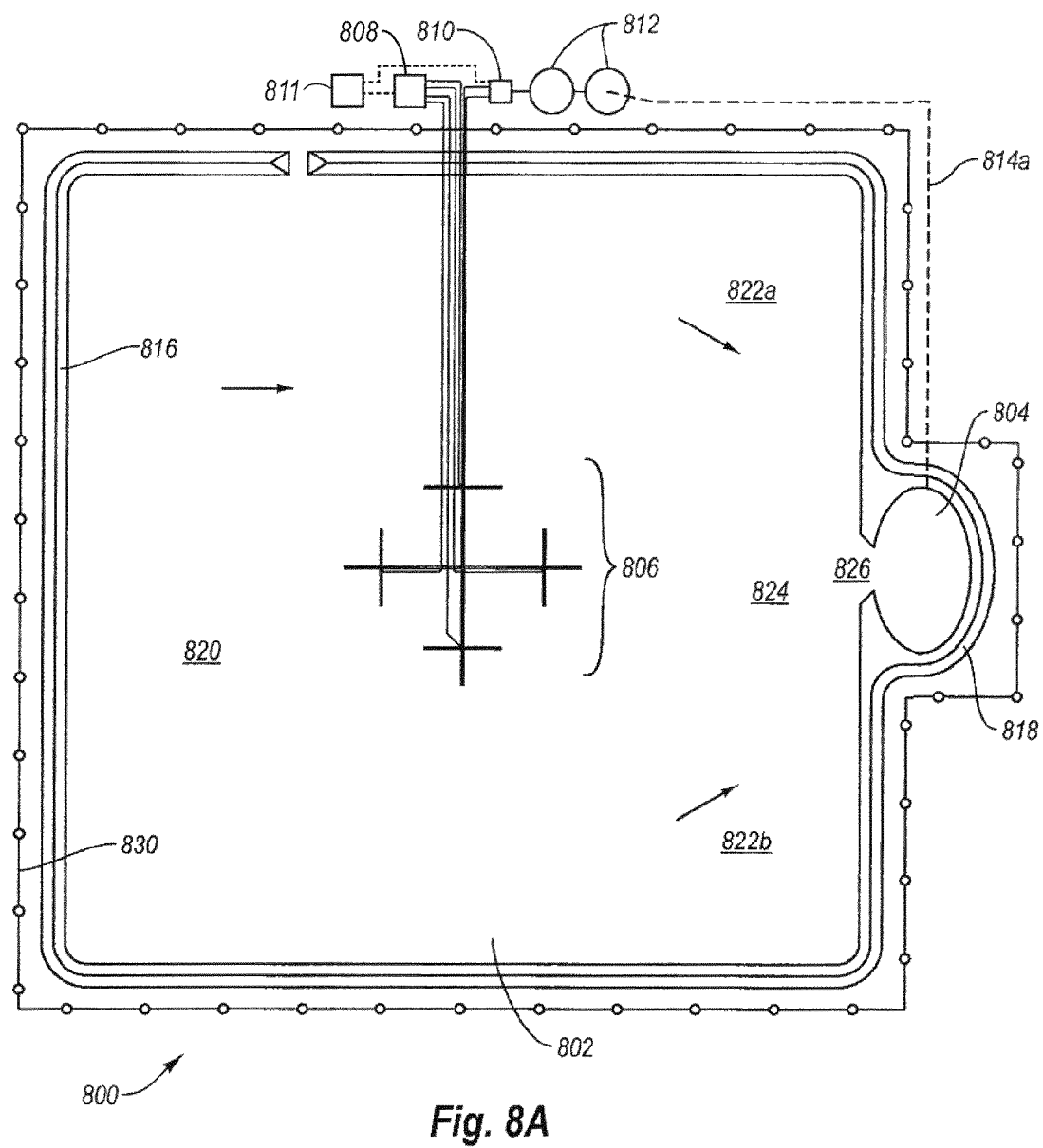
FIG. 8A is an aerial view of an exemplary dry pond water evaporation system that includes a water evaporation nozzles, positioned within an area defined by a water capture depression, a water collection pool, and an air compressor and water pump positioned outside the area defined by the water capture depression.
Figure 8B:
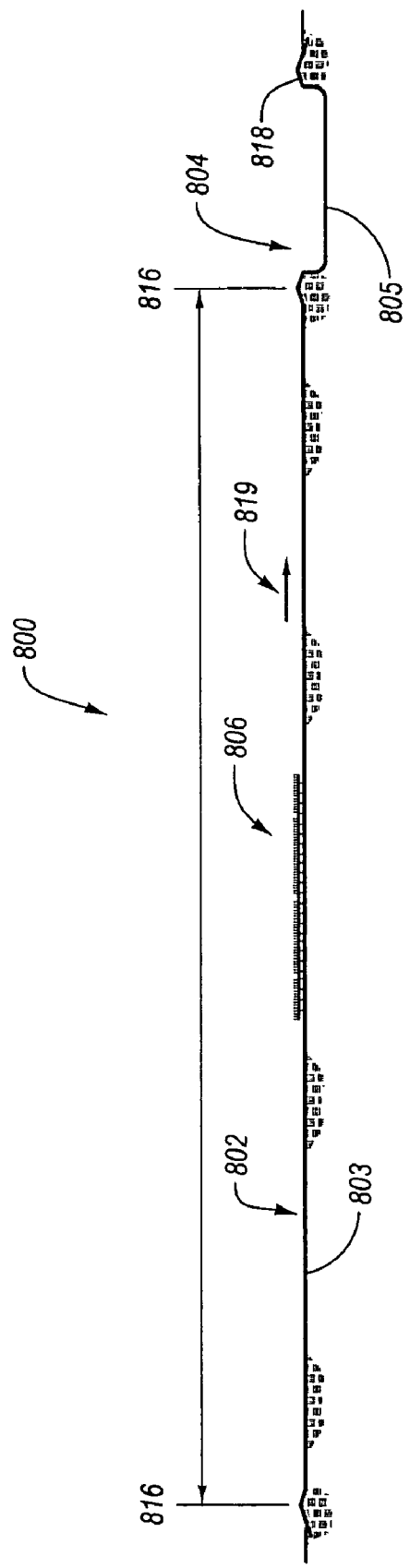
FIG. 8B is a cross-sectional elevation view of the exemplary dry pond water evaporation system of FIG. 8A.

FIGS. 8A and 8B illustrate an exemplary dry pond water evaporation system 800 according to the invention. FIG. 8A is an aerial view of dry pond water evaporation system 800. FIG. 8B is a cross sectional elevation view of the dry pond water evaporation system 800 of FIG. 8A. A "dry pond water evaporation system" is characterized as having little or no water on the surface of a water capture pond or depression as a result of fast evaporation of water and/or drainage of water into a separate water collection pool for recirculation and/or collection of water containing dissolved solids.

Dry pond water evaporation system 800 includes a water capture depression 802 at least partially surrounded by, and having an area defined by, a raised perimeter 816. Raised perimeter may comprise and earthen berm or fence. Dry pond water evaporation system 800 further includes a water collection pool 804 surrounded by, and having an area defined by, a separate raised perimeter 818 (e.g., an earthened berm or fence). Water capturing depression 802 includes a water-resistant surface, such as a water-proof liner 803 (FIG. 8B) upon which water and/or salts fall and collect during operation of dry pond system 800. Water collection pool 804 similarly includes a water-proof liner 805 to keep water from percolating through the bottom and sides.

The water-proof liner may comprise any liner material known in the art for use with waste water impoundment ponds or other water collection systems. According to one embodiment, the water-proof liner is a single- or multilayer membrane. Because the amount of water on top of the water capture depression 802 is relatively small, the water-proof liner 803 can be a single layer membrane, an example of which is a 40-60 mil HDPE geomembrane, such as are commonly used in waste water impoundment or evaporation ponds.

Conversely, because the amount of water within the water collection pool will generally be deeper, the water-proof liner 805 can be a two-layer membrane, an example of which are two layers of a 40-60 mil HDPE geomembrane welded together. According to one embodiment, the two layers can have leak sensors between the layers to detect water leakage.

To provide support for water-proof liner 803, the water capture depression 802 may further include compacted clay beneath the liner 803. Similarly, water collection pool 804 may also include compacted clay beneath the liner 805.

While the water capturing depression 802 is shown having a square configuration, it can have any desired configuration so long as it is able to capture all or substantially all of the spray emitted from pressurized water evaporation system 806 that may fall to the ground. For example, the water capturing depression may be rectangular. Alternatively, it may be circular.

A fine spray or mist of water droplets is emitted over the water capturing depression 802 by a pressurized water evaporation system 806. Pressurized water evaporation system 806 may have any desired configuration such as, for example the multiply-branched water evaporation system 700 illustrated in FIG. 7 or the concentric ring water evaporation system 900 illustrated in FIG. 9, and discussed more fully below. Pressurized water system 806 receives pressurized air from one or more air compressors 808 and pressurized water from one or more water pumps 810. Water pump 810 is shown in fluid communication with water storage tanks 812, which contain waste water to be evaporated and may receive waste water hauled in by truck, or they may be connected to a trunk line from an oil or gas well head. Storage tanks 812 may also receive water recirculated from water collection pool 804. Air compressor(s) 808 and water pump(s) are advantageously positioned outside of water capturing depression 802 in order to prevent buildup of salts, minerals, or water scale. As discussed more fully below, water evaporation system 800 may be equipped with sensors and automatic adjustment controls 811, which can identify and adjust for changes in one or more variables such as wind velocity, wind direction, relative humidity, temperature, barometric pressure and rain and provide adjustments such as those noted below to water evaporation system 800.

Water capturing depression 802 may be level or sloped as desired. Providing a slope causes water to run to toward a desired location, such as water collection pool 804. As seen in FIG. 8B, water capturing depression 802 advantageously includes a downward slope 819 that directs water runoff toward the water collection pool 804. The slope 819 may be provided, for example by a raised side 820 opposite water collection pool 804 and a lower side 824 adjacent to water collection pool 804. A pair of slightly raised side areas 822a, 822b are raised relative to depression 826 of lower side 824 in order to help direct water into the water collection pool 804 and prevent water collecting in the corners of water capturing depression 802.

A security fence 830 may be provided to prevent ingress of people or animals within the confines of water capturing depression 802 and water collection pool 804. Security fence 830 promotes safety and control over the dry pond water evaporation system 800. In addition, bird-control netting (not shown) may be positioned over water capturing depression 802 and water collection pool 804 to prevent ingress by water fowl, other birds, or other animals into the dry pond system.

During use of dry pond water evaporation system 800, a fine spray or mist of water is discharged into the air above water capturing depression 802. Water that is not evaporated into the air falls down onto the liner 803 on the bottom of water capturing depression 802. Dissolved solids within the waste water stream also fall down and are captured by the water capture depression 802, either as a solute in unevaporated water droplets or as a solid particulate. To promote further evaporation of water that falls toward the ground, liner 803 can have a color, such as black or other dark color, designed to heat up by capturing heat energy from the sun. Depending on the temperature of the liner 803, air and/or water and the depth of water on the liner 803 water falling onto liner 803 may evaporate partially or completely. Excess water that does not evaporate flows downward along the slope 819 toward and into water collection pool 804. Salts that build up on top of liner 803 can be periodically swept or washed with water into water collection pool 804.

In the case where the waste water includes dissolved solids, such as salts, including salts and minerals having value, the water within water collection pool 804 may, over time, become increasingly concentrated with such salts or minerals. Until the total dissolved solids (TDS) within water collection pool 804 become sufficiently concentrated to warrant recovery, water from the water collection pool 804 can be recirculated back to pump 810 as part of the feed water for water evaporation system 806. When the TDS in water collection pool 804 become saturated or are sufficiently high to warrant recovery, water from water collection pool 804 may be processed using known methods to recover the TDS. For example, water from water collection pool 804 can be spread out over an evaporation pond or surface and air dried to produce dried salts or minerals, which are then recovered using known means. Alternatively, the concentrated brine water can be sold as is.

Figure 9:
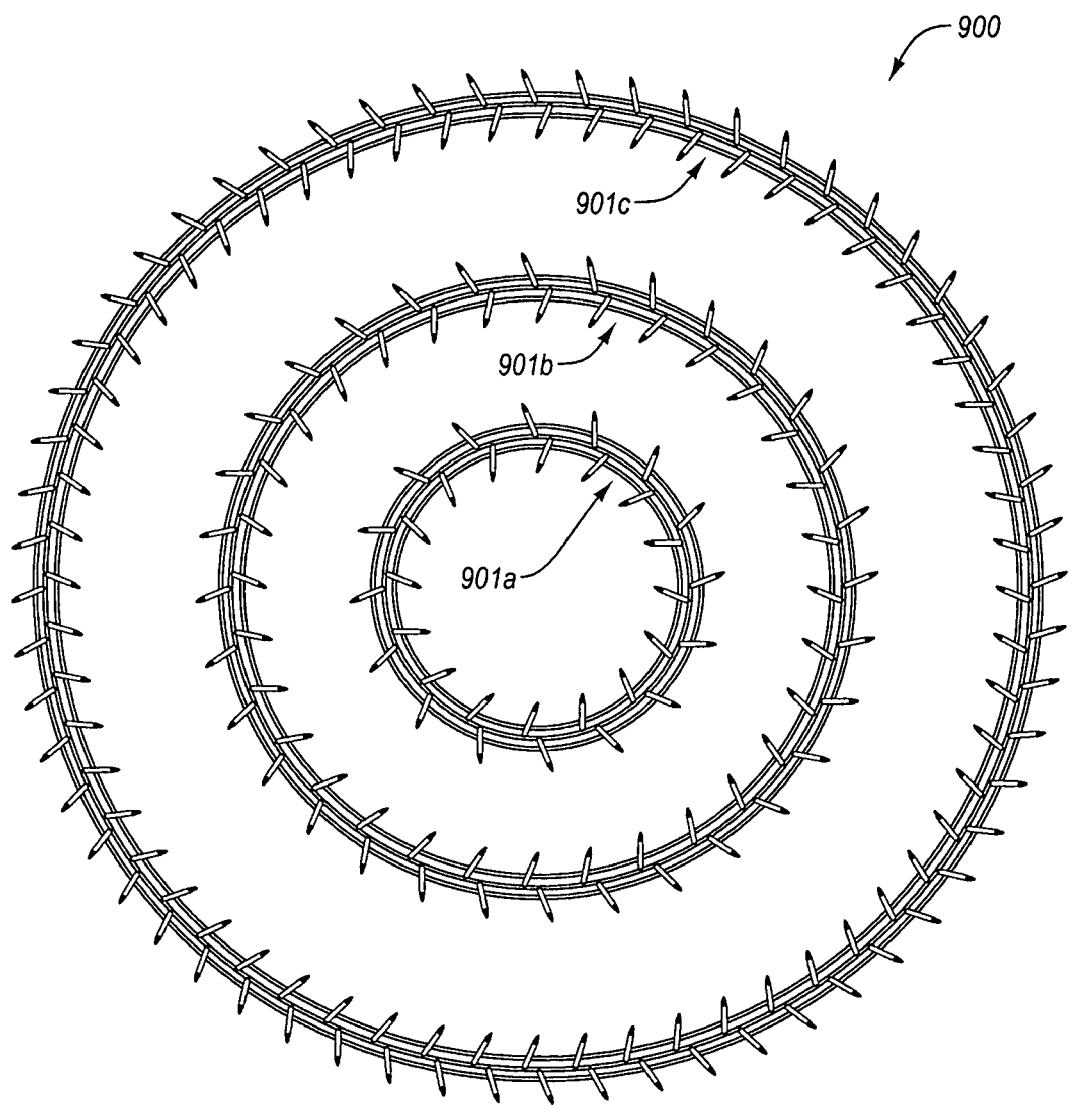
FIG. 9 illustrates another water evaporation system that includes multiple concentric rings of pressurizable air lines, pressurizable water lines, and water evaporation nozzles for use with a dry pond water evaporation system.

FIG. 9 illustrates an alternative configuration of a water evaporation system 900 that may be used in the dry pond water evaporation systems of the invention. Water evaporation system 900 includes multiple concentric rings 901a, 901b, 901c of pressurizable air lines, pressurizable water lines and water evaporation nozzles in fluid communication with the pressurizable air and water lines. The pressurized water evaporation system 900 of FIG. 9 may provide a more circular spray distribution pattern of fine water droplets compared to branched water evaporation systems and may be suitable for use with dry pond systems having a square or circular configuration. In addition, water evaporation system 900 can be readily scaled up or scaled down by adding or subtracting concentric rings of the system as needed in order to expand or contract the overall diameter of the evaporation system and associated spray pattern.

According to one method of using in the dry pond water evaporation systems according to the invention, the pressurized air introduced into the individual water evaporation nozzles may be heated, such as by an air compressor equipped to heat air or an auxiliary heater, in order to increase the rate of water evaporation by the system. According to one embodiment, the pressurized air may be heated to a temperature of at least about 150° F., or to a temperature of at least about 200° F., or to a temperature of at least about 250° F. The pressurized water may be also heated to enhance evaporation, such as by means of a water pump equipped to heat water or an auxiliary water heater, to a temperature of at least about 120° F., or to a temperature of at least about 150° F., or to a temperature of at least about 180° F.

The dry pond water evaporation systems according to the invention may utilize any desired number of individual water evaporation nozzles to emit a spray or mist of fine water droplets above the water capture depression or pond, from as few as 1 to as many as 500 or more. For example, the water evaporation system 700 shown in FIG. 7 includes 480 water evaporation nozzles according to one embodiment, 120 nozzles in each quadrant and 30 nozzles along each individual branch. The water evaporation system 700 is approximately 120 feet in diameter. The water evaporation system used in the dry pond systems may advantageously include at least about 50 individual water evaporation nozzles, or at least about 100 water evaporation nozzles, or at least about 250 water evaporation nozzles, or at least about 450 water evaporation nozzles.

The dry pond water evaporation system 800 illustrated in FIGS. 8A and 8B can have a water capture depression be approximately 1 acre in size in order to reliably capture whatever water droplets or solid residues fall to the ground during the water evaporation process. It will be appreciated that dry pond water evaporation systems according to the invention can have any desired size, such as small as ¼ acre or as large as 16 acres. In the case where it is desirable to minimize the impact of the dry pond water evaporation system to the environment or surrounding areas, it will generally be desirable to limit the size of the system.

The water evaporation system (e.g., as illustrated in FIGS. 8A and 8B) may be equipped with sensors and automatic adjustment controls, which can identify and adjust for changes in one or more variables such as wind velocity, wind direction, relative humidity, temperature, barometric pressure and rain. One of skill in the art can select and install as part of the water evaporation system one or more devices that measure wind velocity, wind direction, relative humidity, temperature, barometric pressure, or rain. Such devices can be interfaced or connected to a computer system having a processor and system memory for monitoring some or all of the foregoing conditions.

The computer system may be programmed with trigger points or alarm levels that, when reached, automatically actuate one or more controls for implementing changes in air pressure and/or water pressure and/or the position and/or angle of the water evaporation nozzles. Alternatively, alerts can be sent to a person monitoring the system and controls can be adjusted manually.

Controls, such as switches or valves associated with the air compressor and water pump, can change the air pressure and/or water pressure delivered to the spray nozzles. Motorized wheels, platforms or scaffolding can change of the position of the spray nozzles within the water capture depression. Wheels, gears or other angulation devices can change the angle of the spray nozzles.

When there is significant wind, it may be desirable or necessary to offset the potential for drift caused by the wind and ensure that the water capture depression is able to capture falling water and/or initially dissolved solids emitted into the air. One way to accomplish this might be to increase the pressure of the water delivered to the water evaporation nozzles and/or decrease the air pressure in order to decrease the air-to-water ratio and increase the size of the water droplets emitted into the air, which reduces drift and causes more water to fall to the ground and be captured by the water capture depression. Increased wind will generally increase water evaporation on the surface of the water capture depression.

Another way to offset the potential for wind induced drift would be to provide a mobile water evaporation system that can move into the direction of the wind in order to increase the distance between the water evaporation nozzles and the outer perimeter of the water capture depression, which increases the capture margin or distance. In addition, the angle of the spray nozzles may be controlled to alter the direction of the spray. On a calm day, the spray nozzles might ideally be in the center of the water capture depression and the air-to-water ratio adjusted to maximize the rate of evaporation.

When relative humidity is high, the air pressure delivered to the water evaporation nozzles can be increased and/or the water pressure decreased in order to increase the air-to-water ratio. This decreases the size of the water droplets and increases surface area, thereby enhancing water evaporation. Conversely, when relative humidity is low, the water pressure delivered to the spray nozzles is increased in order to increase the amount of water emitted into the air for evaporation.

When air temperature is high, the water pressure delivered to the spray nozzles can be increased to increase the amount of water emitted into the air for evaporation. This may also cause more water to fall toward the ground as droplets to be captured by the water capture depression. The higher air temperature typically means there will be higher surface temperature, which increases the rate of surface water evaporation.

Changes in barometric pressure, such as by changing weather or positioning the dry pond system at different altitudes might require adjustment of the air pressure delivered to the spray nozzles in order to maintain a desired air-to-water ratio, which affects the size and quantity of water droplets emitted into the air. In general, when the barometric pressure decreases, the air pressure delivered to the spray nozzles should also be decreased. Conversely, when the barometric pressure increases, the air pressure delivered to the spray nozzles should also be increased.

In the case of rain, it may be desirable to decrease the amount of water emitted into the air by decreasing the water pressure delivered to the water evaporation nozzles. This, in turn, decreases the amount of water that falls to the ground and is captured in the water capture depression.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A dry pond water evaporation system for use in evaporating water from a waste water source, comprising:
a water evaporation system composed of at least one water evaporation nozzle oriented so as to emit a spray or mist of fine water droplets into the air above the at least one water evaporation nozzle and so as to promote evaporation of fine water droplets while in the air, a water pump for providing pressurized water from a waste water source to the at least one water evaporation nozzle, and an air compressor for providing pressurized air to the at least one water evaporation nozzle and so as to promote mixing of water and air through the at least one water evaporation nozzle and facilitate emission of fine water droplets into the air above the at least one evaporation nozzle;
a water capture depression, located on, below, or above the ground, occupying an area at least partially bounded by a first raised outer perimeter, and having a water-resistant surface for capturing water and any initially dissolved solids emitted into the air above the at least one water evaporation nozzle by the water evaporation system that fall down out of the air, the water capture depression having a surface area that promotes further evaporation of captured water that falls down out of the air to form brine with a higher concentration of dissolved solids compared to water that initially falls down out of the air into the water capture depression;
a water flow channel extending through a portion of the first raised outer perimeter through which brine from the water capture depression can flow by gravitational flow; and
a water collection pool occupying an area at least partially bounded by a second raised outer perimeter and being connected to the water flow channel so as to receive brine from the water flow channel, the water collection pool having an elevation that is lower than an elevation of the water capture depression to facilitate gravitational flow of brine from the water capture depression into the water collection pool.

2. A dry pond water evaporation system as in claim 1, the raised outer perimeter of the water capture depression comprising an earthen berm and the water-resistant surface of the water capture depression comprising a water-proof liner.

3. A dry pond water evaporation system as in claim 2, the water-proof liner having a color so as to absorb heat energy from sunlight and promote evaporation of water captured in the water capture depression.

4. A dry pond water evaporation system as in claim 2, the water-proof liner being black.

5. A dry pond water evaporation system as in claim 2, the water-proof liner comprising a polymer membrane, the polymer membrane having a thickness of at least about 40 mils and being composed of high density polyethylene.

6. A dry pond water evaporation system as in claim 1, the water capture depression sloping toward the water flow channel in order to promote gravitational flow and drainage of brine from the water capture depression toward the water collection pool.

7. A dry pond water evaporation system as in claim 1, the water evaporation system including at least 50 nozzles.

8. A dry pond water evaporation system as in claim 1, the water pump being in fluid communication with and receiving waste water from at least one of a water tank, waste water impoundment pond, or source of industrial waste water production.

9. A dry pond water evaporation system as in claim 8, the water pump further being in fluid communication with and receiving water from the water collection pool in order to recirculate water from the water collection pool through the water evaporation system.

10. A dry pond water evaporation system as in claim 8, the dry pond water evaporation system being located relative to a waste water source and adapted so as to receive and process waste water comprising dissolved solids from the waste water source, the system further comprising at least one solids recovery pond or vessel in liquid communication with the water collection pool for receiving brine having a high concentration of total dissolved or undissolved solids from the water collection pool.

11. A dry pond water evaporation system as in claim 1, further comprising sensors and automatic adjustment controls, which can identify and make adjustments in response to changes in at least one variable selected from wind velocity, wind direction, relative humidity, temperature, barometric pressure, or rain, the automatic adjustment controls comprising apparatus that adjust at least one of altering air pressure delivered to the at least one water evaporation nozzle, altering water pressure delivered to the at least one water evaporation nozzle, changing the position of the water evaporation nozzles within the water capture depression, or altering a spray angle of the at least one water evaporation nozzle.

12. A dry pond water evaporation system as in claim 1, the water evaporation system comprising a plurality of water evaporation nozzles oriented so that some nozzles are angled differently than other nozzles in order for the nozzles to provide greater separation between individual clouds of fine water droplets emitted into the air above the nozzles.

13. A dry pond water evaporation system as in claim 1, the water capture depression having a surface area in a range of ¼ acre to 16 acres.

14. A dry pond water evaporation system for use in evaporating water from a waste water source, comprising:
a water evaporation system composed of:
at least 50 water evaporation nozzles oriented so as to emit a spray or mist of fine water droplets into the air above the water evaporation nozzles and so as to promote evaporation of the fine water droplets while in the air;
an air compressor for delivering pressurized air to the water evaporation nozzles; and
a water pump for delivering pressurized water to the water evaporation nozzles that is mixed with pressurized air within the water evaporation nozzles so as to facilitate emission of fine water droplets into the air above the water evaporation nozzles, the water pump being in fluid communication with and receiving waste water containing initially dissolved solids from at least one of a water tank, waste water impoundment pond, or source of industrial waste water production;
a water capture depression, located on, below, or above the ground, occupying an area at least partially bounded by a first raised outer perimeter, and having a water-proof liner for capturing water and initially dissolved solids emitted into the air by the water evaporation system that fall down out of the air, the water-proof liner having a color so as to absorb heat energy from sunlight and promote evaporation of water captured in the water capture depression so as to form brine containing dissolved and/or undissolved solids; and a water collection pool occupying an area at least partially bounded by a second raised outer perimeter and positioned to receive brine from the water capturing depression via a water flow channel interconnecting the water capture depression and the water collection pool.

15. A dry pond water evaporation system as in claim 14, the water pump further being in liquid communication with and receiving water from the water collection pool in order to recirculate water from the water collection pool through the water evaporation system, the system further comprising at least one solids recovery pond or vessel for receiving liquid water having a high concentration of total dissolved or undissolved solids from the water collection pool.

16. A dry pond water evaporation system as in claim 14, the plurality of nozzles being oriented so that some nozzles are angled differently than other nozzles.

17. A dry pond water evaporation system as in claim 14, the water evaporation system including a plurality of nozzle groupings, each nozzle grouping being supplied by a dedicated water supply line.

18. A dry pond water evaporation system as in claim 14, the water evaporation nozzles being oriented in at least one ring.

19. A dry pond water evaporation system for use in evaporating water from a waste water source, comprising:
a water evaporation system composed of:
a plurality of evaporation nozzles oriented so as to emit a spray or mist of fine water droplets into the air to promote evaporation of the fine water droplets while in the air, the water evaporation system including a plurality of nozzle groupings, each nozzle grouping being supplied by a dedicated water supply line;
an air compressor for delivering pressurized air to the water evaporation nozzles; and
a water pump for delivering pressurized water to the water evaporation nozzles that is mixed with pressurized air within the water evaporation nozzles so as to facilitate emission of fine water droplets into the air above the water evaporation nozzles, the water pump being in fluid communication with and receiving waste water containing initially dissolved solids from at least one of a water tank, waste water impoundment pond, or source of industrial waste water production;
a water capture depression, located on, below, or above the ground, occupying an area at least partially bounded by a first raised outer perimeter, and having a water-proof liner for capturing water and initially dissolved solids emitted into the air by the water evaporation system that fall down out of the air, the water-proof liner having a color so as to absorb heat energy from sunlight and promote evaporation of water captured in the water capture depression so as to form brine containing dissolved and/or undissolved solids; and
a water collection pool occupying an area at least partially bounded by a second raised outer perimeter and positioned to receive brine from the water capturing depression via a water flow channel interconnecting the water capture depression and the water collection pool.

20. A dry pond water evaporation system for use in evaporating water from a waste water source, comprising:
a water evaporation system composed of:
at least 50 water evaporation nozzles oriented so as to emit a spray or mist of fine water droplets into the air so as to promote evaporation, the water evaporation nozzles being oriented so that some nozzles are angled differently than other nozzles;
an air compressor for delivering pressurized air to the water evaporation nozzles; and
a water pump for delivering pressurized water to the water evaporation nozzles, the water pump being in fluid communication with and receiving waste water containing initially dissolved solids from at least one of a water tank, waste water impoundment pond, or source of industrial waste water production;
a water capture depression, located on, below, or above the ground, occupying an area at least partially bounded by a raised outer perimeter, and having a water-proof liner for capturing water and initially dissolved solids emitted into the air by the water evaporation system that fall down out of the air, the water-proof liner having a color so as to absorb heat energy from sunlight and promote evaporation of water captured in the water capture depression; and
a water collection pool in liquid communication with the water capturing depression for receiving a flow of liquid water and dissolved or undissolved solids from the water capture depression.

\* \* \* \* \*

UNITED STATES PATENT AND TRADEMARK OFFICE
CERTIFICATE OF CORRECTION

Page 1 of 2

PATENT NO. : 8,016,977 B2
APPLICATION NO. : 12/404139
DATED : September 13, 2011
INVENTOR(S) : Rasmussen et al.

It is certified that error appears in the above-identified patent and that said Letters Patent is hereby corrected as shown below:

Drawings
Sheet 6, replace Figure 4 with the figure depicted below, wherein the instance of "404" in the lower right hand corner has been changed to --402--

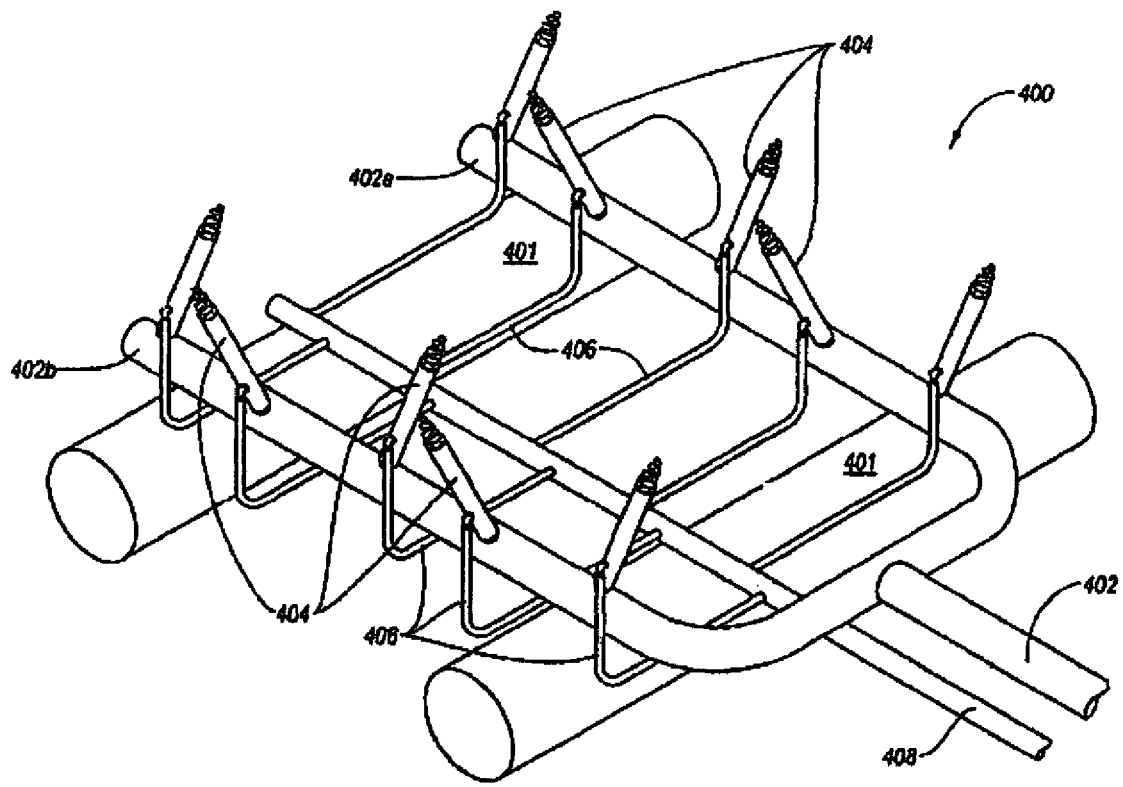

Fig. 4

Signed and Sealed this
Twenty-first Day of February, 2012

David J. Kappos
*Director of the United States Patent and Trademark Office*

Column 2
Line 51, change "furthers" to --further--

Column 4
Line 1, change "droplet" to --droplets--
Line 18, change "filly" to --fully--
Line 60, change "alone" to --along--

Column 5
Line 8, change "includes a water" to --includes water--
Line 52, change "system" to --systems--

Column 6
Line 44, change "exit end 122" to --exit end 112--

Column 8
Lines 32-33, change "input part 122 barrel 100" to --input port 122 of barrel 100--

Column 9
Line 8, change "chamber 120" to --chamber 220--

Column 10
Line 8, after "which" insert --a--
Line 40, change "depending the" to --depending on the--
Lines 52-53, change "evaporations" to --evaporation--
Line 58, change "702b" to --708b--

Column 11
Line 15, change "and" to --an--
Line 38, unbold "40-60"

Column 12
Line 11, change "to run to toward" to --to run toward--

Column 13
Line 15, change "using in the" to --using the--
Line 25, change "may be also be" to --may also be--

Column 14
Line 11, change "change of the" to --change the--